US008646804B2

(12) United States Patent
Derks et al.

(10) Patent No.: US 8,646,804 B2
(45) Date of Patent: Feb. 11, 2014

(54) APPARATUS FOR A CONVERTIBLE WHEELED PATIENT AID

(75) Inventors: Richard P. Derks, Hawthorn Woods, IL (US); Ishwor P. Adhikari, Mundelein, IL (US)

(73) Assignee: Medline Industries, Inc., Mundelein, IL (US)

( * ) Notice: Subject to any disclaimer, the term of this patent is extended or adjusted under 35 U.S.C. 154(b) by 0 days.

(21) Appl. No.: 12/789,782

(22) Filed: May 28, 2010

(65) Prior Publication Data

US 2010/0301574 A1 Dec. 2, 2010

Related U.S. Application Data

(60) Provisional application No. 61/182,600, filed on May 29, 2009.

(51) Int. Cl.
*B62M 1/00* (2010.01)

(52) U.S. Cl.
USPC .................. 280/648; 280/87.021; 280/87.01; 135/67; 135/74

(58) Field of Classification Search
USPC .................. 280/47.4, 250, 42, 47.36, 87.014, 280/87.051, 250.1, 304.1, 642, 643, 647, 280/648, 650; 135/67; 297/93
See application file for complete search history.

(56) References Cited

U.S. PATENT DOCUMENTS

| | | | | | |
|---|---|---|---|---|---|
| 3,338,628 | A | * | 8/1967 | Evans | 297/188.2 |
| 4,211,309 | A | | 7/1980 | Ruggiero | |
| 4,229,039 | A | * | 10/1980 | Day | 297/232 |
| 4,341,381 | A | | 7/1982 | Norberg | |
| 4,358,125 | A | * | 11/1982 | Charles | 280/250.1 |
| D281,771 | S | | 12/1985 | Webb | |
| D289,507 | S | | 4/1987 | Danielsson | |
| 5,058,912 | A | * | 10/1991 | Harroun | 280/87.021 |
| 5,060,967 | A | * | 10/1991 | Hulterstrum | 280/650 |
| 5,224,731 | A | * | 7/1993 | Johnson | 280/648 |
| 5,320,122 | A | * | 6/1994 | Jacobson et al. | 135/66 |
| 5,364,120 | A | * | 11/1994 | Shimansky | 280/650 |
| 5,419,571 | A | * | 5/1995 | Vaughan | 280/250.1 |
| D360,174 | S | | 7/1995 | Kjell | |
| D367,833 | S | | 3/1996 | Ahlbertz | |
| D372,890 | S | | 8/1996 | Ferm | |
| 5,741,020 | A | * | 4/1998 | Harroun | 280/42 |
| D396,437 | S | | 7/1998 | Liljedahl | |
| 6,338,493 | B1 | * | 1/2002 | Wohlgemuth et al. | 280/30 |
| 6,378,883 | B1 | * | 4/2002 | Epstein | 280/250.1 |
| D503,909 | S | | 4/2005 | Tolfsen | |
| D519,423 | S | | 4/2006 | Tolfsen | |
| 7,192,043 | B1 | * | 3/2007 | McLuen | 280/250.1 |
| 7,219,906 | B2 | * | 5/2007 | Hallgrimsson et al. | 280/87.041 |

(Continued)

*Primary Examiner* — John Walters
*Assistant Examiner* — James Triggs
(74) *Attorney, Agent, or Firm* — Fitch Even Tabin & Flannery LLP

(57) ABSTRACT

A convertible wheeled patient aid for assisting a patient in a first transport mode and a second transport mode comprising a frame having at least one wheel, a seat, a handle. A configurable backrest, configurable from a first position to a second position. The aid further comprising a leg rigging movably coupled to the frame from a first position to a second position. A leg rigging retaining member, selectively engageable with the leg rigging member.

13 Claims, 5 Drawing Sheets

(56) References Cited

U.S. PATENT DOCUMENTS

| | | | | |
|---|---|---|---|---|
| D560,563 | S | 1/2008 | Fransson | |
| 7,484,740 | B2 | 2/2009 | Miller | |
| 7,628,411 | B2 * | 12/2009 | Meyers et al. | 280/87.021 |
| 7,918,473 | B2 * | 4/2011 | Yao | 280/287 |
| 2004/0245737 | A1 * | 12/2004 | Hallgrimsson et al. | 280/87.01 |
| 2005/0211285 | A1 * | 9/2005 | Cowie et al. | 135/74 |
| 2006/0284040 | A1 * | 12/2006 | Nixon et al. | 248/311.2 |
| 2007/0034243 | A1 | 2/2007 | Miller | |
| 2008/0106059 | A1 * | 5/2008 | Jacobs et al. | 280/250.1 |
| 2010/0301574 | A1 * | 12/2010 | Derks et al. | 280/47.4 |

* cited by examiner

APPARATUS FOR A CONVERTIBLE WHEELED PATIENT AID

CROSS-REFERENCE TO RELATED APPLICATION

This application claims the benefit of U.S. Provisional Application No. 61/182,600, filed May 29, 2009, which is hereby incorporated by reference in its entirety.

FIELD OF THE INVENTION

The present invention relates generally to patient aids. More particularly, the present invention relates to a convertible wheelchair and wheeled patient walker.

BACKGROUND OF THE INVENTION

Numerous health patients require assistance when walking, especially over long distances, but also desire an active lifestyle. One type of wheelchair that is commonly used is a transport wheelchair (referred to hereinafter interchangeably as the "wheelchair" or the "transport wheelchair"), which is also known as a "companion chair" because it generally has smaller wheels and requires a person to push the wheelchair from behind. The wheelchair must be sufficiently strong to safely support the weight of a wheelchair user and, yet, it must be light enough to allow easy transportation. For example, an elderly person may require the use of the wheelchair when engaging in activities outside of the home, e.g., going to a mall, visiting a park, eating dinner at a restaurant, etc. To be able to engage in the desired activities, it is necessary to transport the wheelchair to the location of the desired activities, e.g., loading and unloading the wheelchair to and from the trunk of a car. In many cases, the person transporting the chair is the spouse of the wheelchair user. The spouse may be an elderly person that may have difficulty lifting a heavy wheelchair. In other cases, even if the person transporting the chair may be an employed caretaker handling the wheelchair may still be cumbersome.

Another type of patient aid is a walking aid that incorporates a support structure with handles and wheels that allow the aid to be wheeled while supporting the patient during movement. Sometime referred to as a "rollator" the apparatus has four wheels, a frame for supporting handles and in some instances a seat.

Rollator users often get tired on outings because they do not have the stamina to go far distances when walking with their rollators. Wheelchair users often feel restless that they must remain seated during an entire outing; also, their visibility on sightseeing tours is impaired because they cannot use the device in stand-up or walking position. Finally, physical therapists are at times concerned because the wheelchair patient is not becoming functional more quickly.

Therefore, there exists a need for a combination convertible wheeled patient aid that is stable, that has a low weight, and that has a high weight capacity in comparison to current transport wheelchairs, that can accommodate a wheelchair mode and a wheeled walker mode while maintaining the look and feel of a true wheelchair.

BRIEF DESCRIPTION OF THE DRAWINGS

The foregoing and other advantages of the invention will become apparent upon reading the following detailed description and upon reference to the drawings.

Figure 1:
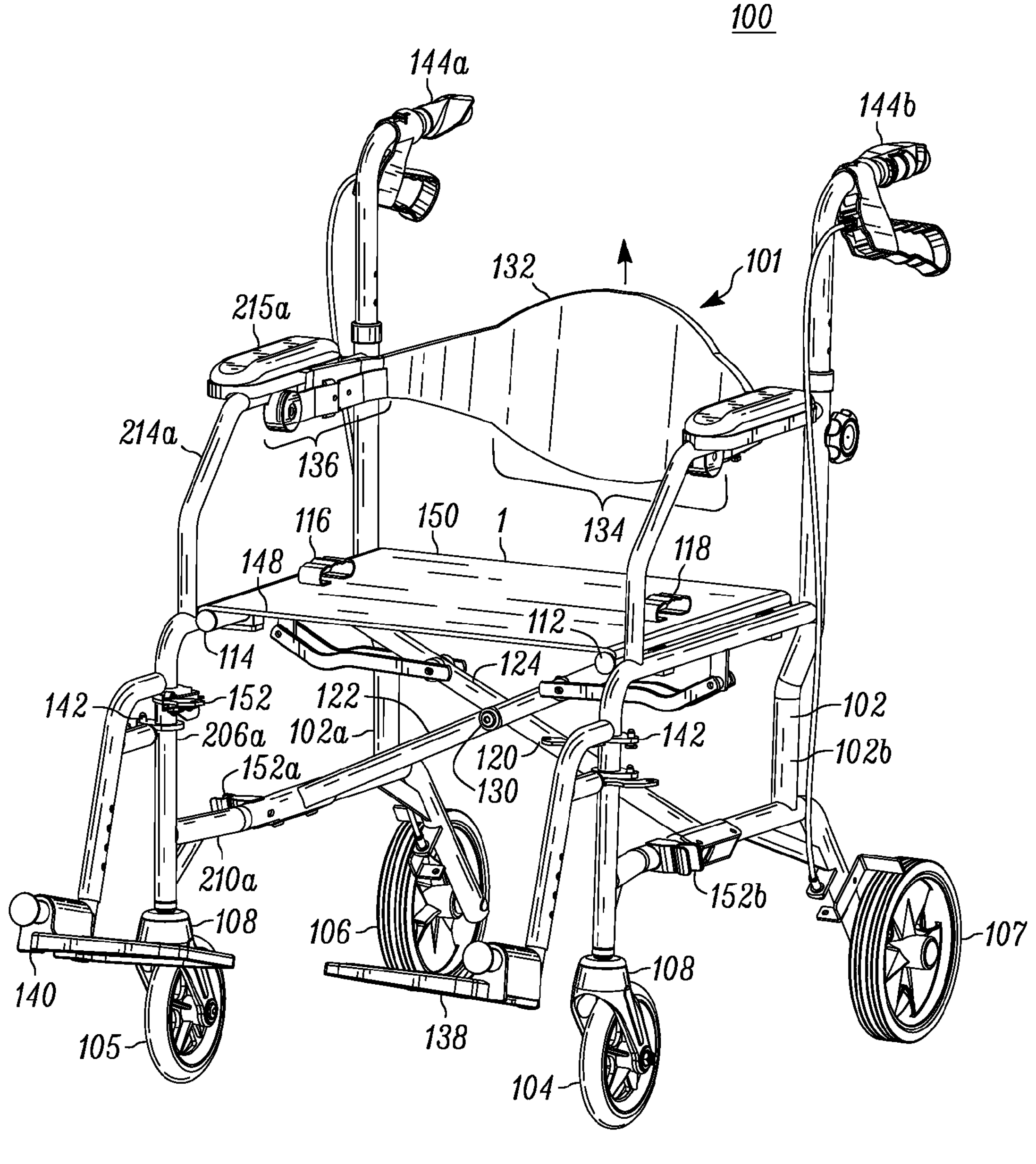
FIG. 1 illustrates a perspective view of a convertible wheeled patient aid, according to one embodiment.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention.

DESCRIPTION OF ILLUSTRATIVE EMBODIMENTS

Figure 2:
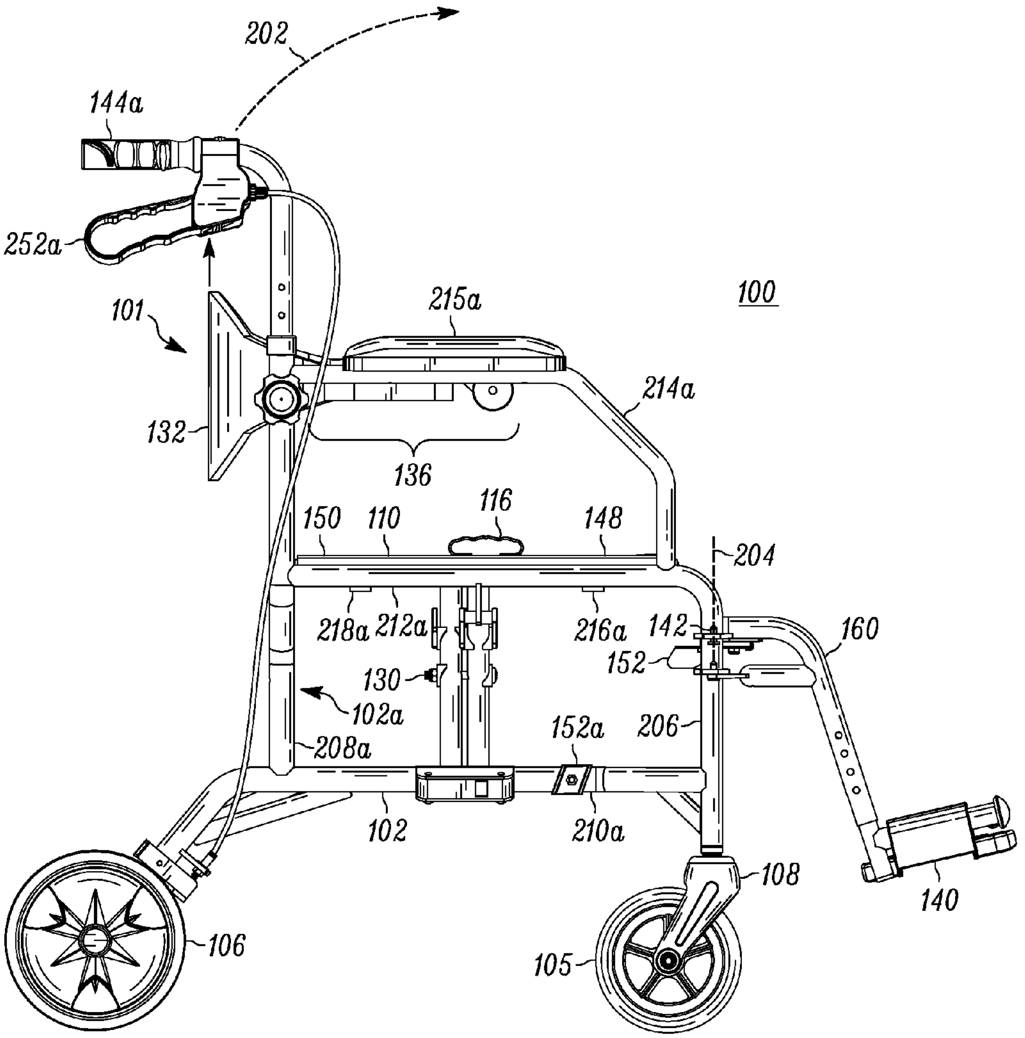
FIG. 2 illustrates a side view of a first configuration of the convertible wheeled patient aid according to one embodiment.
Figure 3:
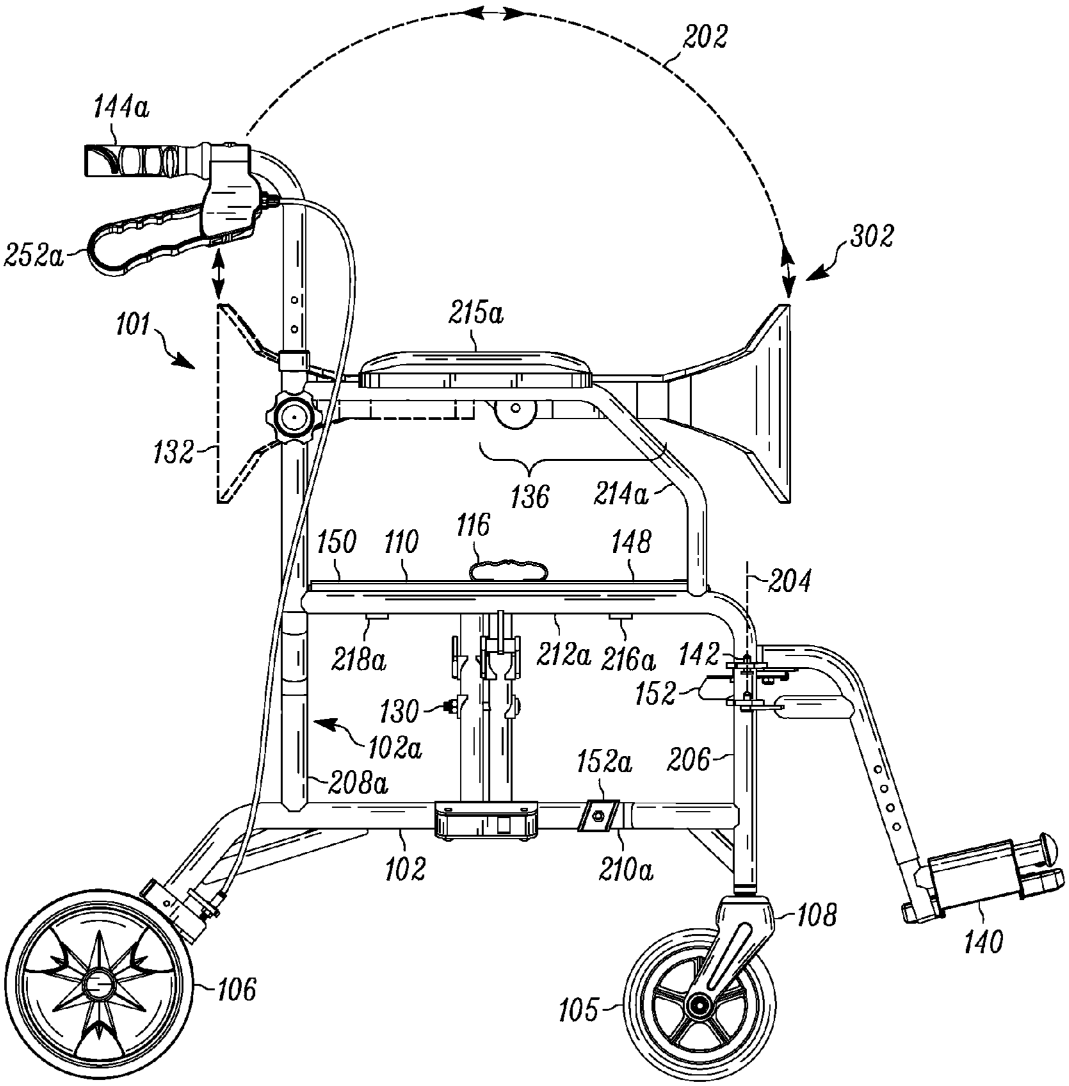
FIG. 3 illustrates a side view of a second configuration of the convertible wheeled patient aid according to one embodiment.

Referring to FIG. 1 and FIG. 2, a manual convertible wheelchair and walker device 100 is shown in a first transport position for transporting a person. The convertible device 100 is changeable between the transport position for a wheelchair mode of operation and a rolling walker configuration as shown in FIG. 3 for a wheeled walker mode of operation. In FIGS. 1-3, the convertible device 100 comprises a frame 102, four wheels, 104, 105, 106, 107 coupled to the frame, the front first wheel 104 and the front second wheel 105 are coupled to the frame 102 with swivel joints 108 to allow the device to turn. In this embodiment the first rear wheel 106 and the second rear wheel 107 are fixed. In another embodiment all wheels may be coupled to swivel joints. In yet another embodiment none of the wheels are coupled to a swivel joint but another steering mechanism.

A seat 110 is coupled to the frame 102 and in this embodiment is stowable. The frame is foldable and the stowable seat 110 folds as the frame folds together. The seat has two support members on a first seat 112 support and a second seat support 114 coupled opposite sides of the seat 110. Each seat support is engageable with the frame, when the frame is in the unfolded position. The seat has at least one folding assist member that is attached to the seat 110 that assists the user in pulling up on the seat during the folding of the seat and frame into the folded position. In this embodiment the seat has a first folding assist remember 116 and a second folding assist member 118. Below the seat is a scissor member brace 120 comprising a first arm 122 and a second arm 124. Each arm 122, 126 is coupled to a first lower frame member 126 and a second lower frame member 128. Each arm is also coupled to one of the first seat support 112 and the second seat support 114. The first arm 122 and the second arm 124 are coupled together at least at a first pivot point 130 having a first rotation axis. The seat has a first seat edge 148 and a second seat edge 150.

Referring to FIGS. 1-2, the convertible device 100 frame 102, in this embodiment, includes a pair of side frames **102*a*, 102*b* that are coupled to each other via a single scissor frame brace 120. Because the device 100 is generally symmetrical along a central plane of the scissor frame 120, the side frames 102*a*, 102*b* are generally identical and, therefore, a detailed explanation will be provided referring only to one of the side frames (i.e., the left side frame 102***a*). However, in alternative embodiments (not shown) the side frames 102*a*, 102*b* may not be generally identical.

The side frame 102*a* includes a front member 206*a* and a rear member 208*a* that are coupled via a lower longitudinal member 210*a* and an upper longitudinal member 212*a*. The front member 206*a* has a lower end that extends beyond an intersection between the front member 206*a* and the lower longitudinal member 210*a*. The rear member 208*a* has a lower end that extends beyond an intersection between the rear member 208*a* and the lower longitudinal member 210*a*. The lower end of the rear member 208*a* is closer to a horizontal floor plane than the lower end of the front member 206*a*.

The left side frame 202*a* further includes an armrest member 214*a* having a horizontal end coupled to the rear member 208*a* and a vertical end coupled to the upper longitudinal member 212*a*, the horizontal end and the vertical end being connected via a slanted member. The slanted member has a front end that is located lower (or closer to the upper longitudinal member 212*a*) than a rear end. The slanted member forms one continuous member with the horizontal end and the vertical end of the armrest member 214*a* (e.g., it does not require welding) to minimize the weight of the armrest member 214*a*, while maintaining a high structural strength. The slanted member of the armrest member 214*a* can be used by a wheelchair user to support himself or herself when changing between a seated position and a standing position. An armrest pad 215*a* is coupled to the armrest member 214*a* for comfort of the user.

The left side frame 202*a* also includes a pair of supporting members, having a front supporting member 216*a* and a rear supporting member 218*a*. The front supporting member 216*a* is located near the front member 206*a* and the rear supporting member 218*a* is located near the rear member 208*a*. The supporting members 216*a*, 218*a* have a general "C" shape and are made from aluminum or aluminum alloys. Each supporting member is engageable with the first seat support 112. Similarly on the other right side frame, two more supporting members are enageable with the second seat support 114. Further, the supporting members 216*a*, 218*a* include an outer non-metallic sleeve (e.g., polyurethane) that engage the seat supporting member 112, 114. In alternative embodiments, the number, shape, or material of the supporting tabs 216*a*, 216*b*, 218*a*, 218*b* may vary based on particular design requirements.

The convertible device 100 has a foot rest 140 that may comprise a first foot rest 140*a* and a second foot rest 140*b*. The first foot 140*a* rest is for a left foot and the second foot rest 140*b* is for a right foot of the patient. The foot rests 140 are selectively rotateably coupled to the frame 102. Said in another way, the foot rest may be selectively rotated by unlocking each foot rest from a locking mechanism 152 and rotating the foot rest 140 about a pivot point. In one embodiment the foot rests 140 are coupled to a pivot point 142 that is along a substantially vertical axis 204. Each foot rest 140*a/b* comprise an extension member 160*a* coupled to the pivot point 142 support member. Each pivot point support member 142*a/b* in this embodiment is similar and mirror one another. In this embodiment the pivot point 142 is a combination pivot point support member 142, both supporting the foot rest and allowing the foot rest to pivot around to the side of the convertible device 100. The pair of foot rests, also known as leg riggings 140*a*, 140*b* for supporting the user's legs are attachable respectively to the front members 206*a*, 206*b*. The leg riggings 140*a*, 140*b* are removable, height adjustable, and pivotable.

Each side frame 102*a* 102*b* has a leg rigging retention member 152 i.e. 152*a* and 152*b* coupled thereto. The leg rigging retention member 152 selectively engages the leg rigging 140, securing the leg rigging 140 to the side of the device and away from out in front of the device which is distal to the handles. In one embodiment, the leg rigging extension member 160*a* is a tubular member that complimentarily engages the leg rigging retention member 152*a*. In this embodiment the leg rigging retention member has an inner size that is substantially the same as the outer diameter of the tube member such that the tube member of the foot rest extension member is selectively secured by friction fit to the leg rigging retention member 152*a*.

The device 100 has a backrest 132 to support a patient's back while sitting in the device 100. The backrest 132 is selectively configurable into a plurality of positions depending on the desire mode of use of the device 100. In this embodiment the backrest has a back portion 134 and at least one backrest pivot portion 136. The backrest pivot portion 136 allows the backrest to flip over or said in another way rotate at least 180 degrees, along path 202 from a first backrest configuration 101 shown in FIGS. 1 and 2 to a second backrest configuration 302 as shown in FIG. 3. In one embodiment, back rest support stops are configured to mechanically support the back rest in at least a first position and a second position. In one embodiment the back rest stops are coupled to the frame below the arm rest 215. In another embodiment the pivot point 137 of the backrest pivot portion 136 has a mechanical feature 142 built in to the pivot point 137 such that the pivot arm 139 engages the mechanical stop feature 142, supporting the pivot arm 139 in one of the first backrest configuration 101 and the second backrest configuration 302.

Figure 4:
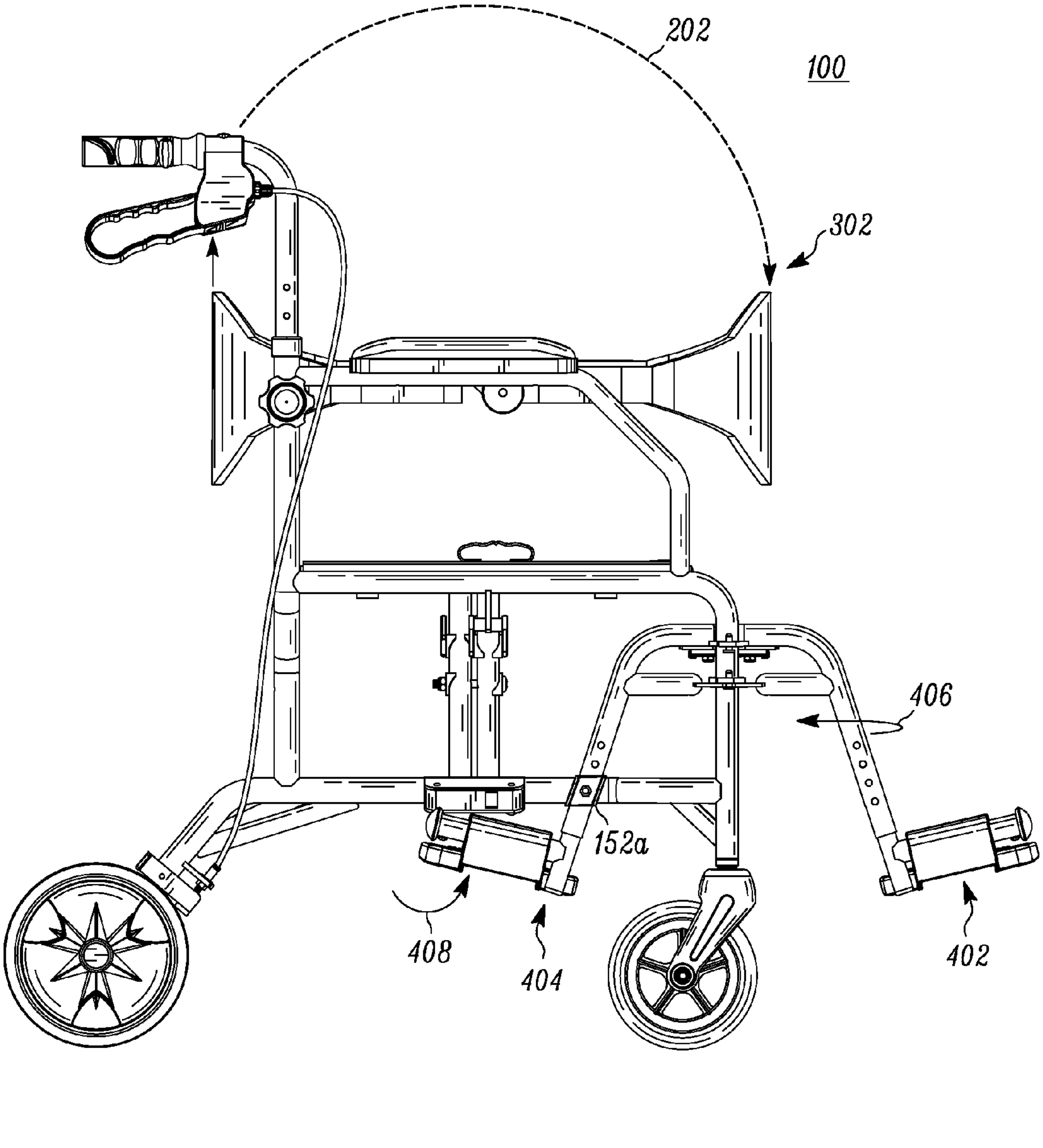
FIG. 4 illustrates a side view of the leg rigging configurations according to one embodiment.

FIG. 4 illustrates a side view of the leg rigging configurations according to one embodiment. The leg rigging 140 is disengageable from the lock position, wherein the leg rigging extends out and away from the handles, in a leg rigging locked wheelchair mode 402 such that the patient may rest the feet on the foot rest portion in wheel chair mode. Disengaging the leg rigging 140 and pivoting the rigging 140 about the pivot member 142 as indicated by arrow 406 to a leg rigging stowed mode 404. In the leg rigging stowed mode 404 the leg rigging member is engaged with the leg rigging retention member 152*a*. The leg rigging is put into stowed mode 404 when the wheeled aid is put into wheeled walker mode so that the leg rigging members are out of the way and on the side of the device 100.

Figure 5:
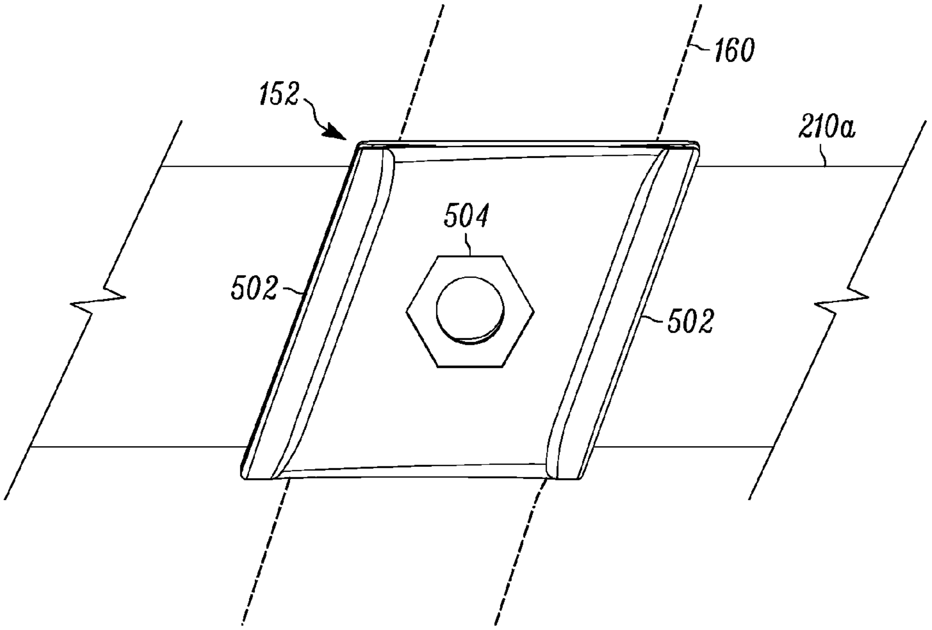
FIG. 5 illustrates a front view of the leg rigging retention member according to one embodiment.

FIG. 5 illustrates a front view of a leg rigging retention member 152 according to one embodiment. The retention member 152 comprises a first side 502*a* and a second side 502*b* which are substantially parallel and configured to frictionally retain the extension member 160 of the leg rigging, removably engaging the leg rigging 140 into place for storage, particularly when the patient aid is in the rolling walker configuration. The sides 502 align angularly with the angle of the legging rigging extension member 160*a* that engages the retention member 152. A Bolt and nut 504 combination secures the retention member 152 to the lower longitudinal member 210*a* of the frame.

Figure 6:
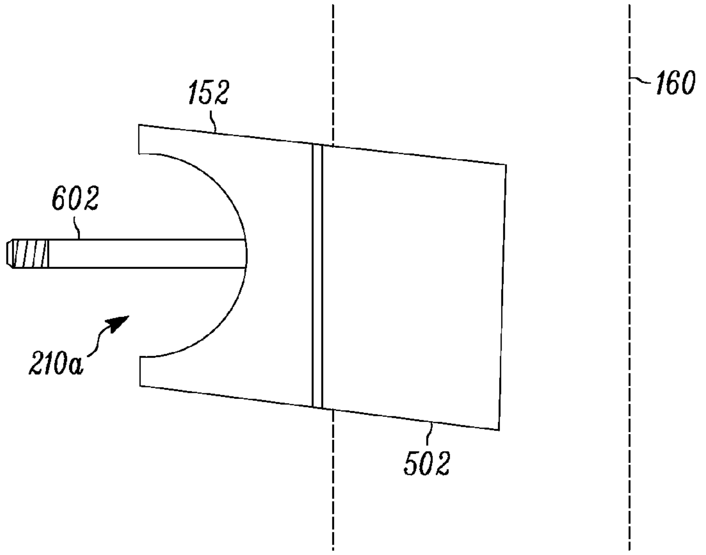
FIG. 6 illustrates a side view of the leg rigging retention member according to one embodiment.

FIG. 6 illustrates a side view of the leg rigging retention member 152 according to one embodiment. The bolt shaft 602 is shown however longitudinal member 210*a* is not shown except for its general location relative to the retention member by the arrow of 210*a*. The retention member has an inwardly curved concave portion 604 configured to receive the longitudinal member 210*a*. The position of the extension member 160 is shown by the broken lines to illustrate the relative position of the extension member to the retention member 152.

The backrest 132 is made of a base member and an outer surface that is woven or non-woven and comfortable to the patient. The backrest 132 in this embodiment is made out of a plastic base member covered by a softer pliable material such as a nylon fabric. In one embodiment a foam pad is inserted between the base material and the outer skin facing covering. The backrest has a symmetric shape to accommodate the two configurations, the first backrest configuration 101 and the second backrest configuration 302.

The convertible device 100 further includes handles 144 for either the patient to use in wheeled walker mode or the patient assistant to use in the wheelchair transport mode. In this embodiment the handles include a first handle 144*a* and a second handle 144*b*. Brakes and brake levers couple to a cable are also shown with a wheel brake portion to assist in stopping the convertible device 100.

In wheelchair or transport mode, wherein a second person wheels the patient by pushing the device 100 with the patient sitting in the chair, the backrest is in the first backrest configuration 101. Both the patient and the second person (patient assistant) are facing the same direction in this wheelchair mode. In the wheeled walker mode, the patient uses the device 100 as a support holding handles 144*a* and 144*b*, facing the toward the chair, as the second person patient assistant would. However, the backrest 132 is in the second configuration 302 and the patient may sit by rotating about 180 degrees from the walking position and sit on the seat 110 in a resting position, facing the second seat edge 150 which is in the opposite direction from the wheelchair mode in which the patient sits facing the first seat edge 148 with the patients feet positioned on the foot rest 140*a*.

In the wheeled walker mode, the backrest is in the second backrest configuration 302 and the leg rigging 140*a* is in a stowed position, as shown in FIG. 4, wherein the leg rigging 140*a* is temporarily removably engaged with the leg rigging retention member 152*a*. The leg rigging extension member 160 is removed from the retention member 152 by apply a force to the leg rigging 140*a* to overcome the frictional force, of the retention member 152.

In one embodiment, a front caster and a rear wheel are attached respectively to the lower ends of the front member 206*a* and the rear member 208*a*. The front caster is attached to the front member 206*a* by inserting a caster shaft into the lower end of the front member 206*a*. Alternatively, the front caster 226*a* can be attached to the device 100 using various fasteners. The rear wheel is attached to the rear member 208*a* via a central region of the wheel. The rear wheel has an outer diameter such that the outer periphery of the rear wheel is lower than the intersection of the rear member 208*a* and the lower longitudinal member 210*a*.

A brake mechanism 232*a* is mounted on the rear member 208*a* near and above the outer periphery of the rear wheel 106. The brake mechanism 232*a* is used by a person transporting the wheelchair 100 to securely fix the rear wheel 106 while in a stopped position.

The scissor frame 204 further includes a pair of seat supports, that are securely attached to a respective upper end of the cross-members 234*a*, 234*b*. When the device 100 is in the transporting position (e.g., the user is seated in the chair), the seat supports, are supported by the four supporting members 216*a*, 216*b*, 218*a*, 218*b*.

The device 100 includes a seating area, which is attached at each end to a respective one of the seat supports. The seating area is made from a flexible material, such as any upholstery material. For example, the material can be a vinyl material.

The device 100 has a plurality of structural reinforcements, including a front reinforcement tubing, a rear reinforcement tubing, a front reinforcement weld 374*a*, and a rear reinforcement weld in one embodiment. The front reinforcement tubing is located within a front portion of the lower longitudinal member 210*a* and the rear reinforcement tubing is located within the rear member 208*a*, near the rear wheel attachment point. The front reinforcement weld is located below the front end of the lower longitudinal member 210*a*, at the intersection with the front member 206*a*. The rear reinforcement weld is located below the rear end of the lower longitudinal member 210*a*, at the intersection with the rear member 208*a*. The structural reinforcements provide structural support for the light-weight wheelchair 100 for maintaining a high weight capacity.

The tubular members of the wheelchair 100 (e.g., the front members 206*a*, 206*b*, the rear members 208*a*, 208*b*, the lower longitudinal members 210*a*, 210*b*, the upper longitudinal members 212*a*, 212*b*, the cross-members, etc.) are optionally made using aluminum tubing having a diameter thickness of 2 millimeters (0.08 inches) or less. For example, according to one embodiment, the lower longitudinal member 210*a* has a length of 448 millimeters (17.64 inches), a diameter of 10 millimeters (0.39 inches), a diameter thickness of 2 millimeters (0.08 inches), and is made using aluminum 6061T4. Similarly, according to an alternative embodiment, the rear member 208*a* (from its lower end to the central axis of the upper longitudinal member 212*a*) has a length of 335 millimeters (13.19 inches), a diameter of 12 millimeters (0.47 inches), a diameter thickness of 2 millimeters (0.08 inches), and is made using aluminum 6061T4.The portion of the rear member 208*a* from its lower end to the central axis of the lower longitudinal member 210*b* (i.e., the intersection between the rear member 208*a* and the lower longitudinal member 210*b*) is 127 millimeters (5.00 inches), according to yet another alternative embodiment. Optionally, all the structural members of the wheelchair 100 (e.g., all the members of the side frames 202*a*, 202*b*) are made using aluminum or aluminum alloys. In alternative embodiments, other light-weight materials may be used.

The convertible wheeled device 100 may be used by converting from a rollator (wheeled walker) mode such that users who want to ride, in stead of walk, may use the device in wheelchair mode, for example, when making longer trips. The Translator will also be used by wheelchair users, converting from the wheel chair mode, for example when the patient wants to get more exercise, and accelerate their functional development by walking into a rollator mode.

Combination wheeled aid is built using a wheelchair frame (which is much roomier and more comfortable in terms of seating). The seat has a full seat as compared to current rollators. Further the convertible device 100 may include a cup holder. The device has clip locks on the sides for locking in the footrests when the footrests are not in use. The device has more storage space between its side carrying case and under-the-seat basket. Because of the wheelchair base, the device has significantly (on average 70%) more room than the seats on similar products. The device arms are more comfortable than similar products as the arm pads for the patient arms are independent from the push grips used by the caregiver. The device arms are sloped back—allowing the unit to be pulled up to a table.

In alternative embodiments, the wheelchair 100 includes one or more optional features. For example, the wheelchair 100 optionally includes a user seatbelt and/or a cup holder knob coupled to a member of one or more of the side frames 202*a*, 202*b*. The user seatbelt can be attached to the lower back area and the cup holder can be screwed on the upper longitudinal member 212*a*, 212*b*.

While the present invention has been described with reference to one or more particular embodiments, those skilled in the art will recognize that many changes may be made thereto without departing from the spirit and scope of the present invention. For example, instead of retaining the leg rigging by friction, a magnetic assembly may be used. Further a strap may be used to retain the leg rigging to the side of the device. In yet another embodiment, the leg rigging may be secured to the side by a strap and snap or any combination thereof The form of the backrest may not necessarily be symmetric. The form may be any shape that accommodate both configurations of the seat. Each of these embodiments and obvious variations thereof is contemplated as falling within the spirit and scope of the invention, which is set forth in the following claims.

What is claimed is:

1. A convertible wheeled patient aid for assisting a patient in a first transport mode and a second transport mode comprising:

a frame having at least one wheel, a seat, a handle;

a configurable back rest, configurable from a first position to a second position;

a first leg rigging movably coupled to the frame from a first unstowed position to a second stowed position; and a first leg rigging retaining member, selectively engageable with the first leg rigging in the stowed position but not in the unstowed position;

a second leg rigging that is separate from the first leg rigging and that is movably coupled to the frame from a first unstowed position to a second stowed position; and a second leg rigging retaining member, selectively engageable with the second leg rigging in the stowed position but not in the unstowed position;

wherein the first leg rigging retaining member and the second leg rigging retaining member are physically discrete from one another such that the first leg rigging retaining member cannot selectively engage the second leg rigging and the second leg rigging retaining member cannot selectively engage the first leg rigging.

2. The patient aid of claim 1, further comprising a plurality of support members coupled to the frames for supporting a seating area of the device.

3. The patient aid of claim 1, wherein all structural members of the convertible wheeled patient aid, including a first side frame and a second side frame and a scissor frame, are aluminum or aluminum alloys.

4. The patient aid of claim 1, wherein the frame comprises a pair of side frames, wherein each of the side frames includes a longitudinal upper member and a longitudinal lower member for coupling a front member and a rear member, the longitudinal upper member being rearwardly angled for minimizing the likelihood of the person falling from the wheelchair when the person is seated in the wheelchair.

5. The patient aid of claim 1, wherein the frame comprises a pair of side frames and wherein the patient aid further comprising a pair of armrests coupled respectively to the side frames, the armrests having a front angled member for providing support to the person when the person is moving between a seating position and a standing position.

6. The patient aid of claim 1, further comprising:

a rear-lower member coupled to each of a pair of side frames;

a rear-upper member coupled to the rear-lower member via a latching mechanism, the rear-upper member being movable between an upright position and a lowered position; and a push-grip member coupled at an end of the rear-upper member and positioned generally perpendicular to the rear-upper member, the push-grip member being angled outward with respect to the wheelchair such that the rear-upper member is generally parallel to the rear-lower member in the lowered position.

7. The patient aid of claim 1, wherein each of a pair of side frames includes a front member and a rear member coupled via a pair of longitudinal members, the longitudinal members including an upper longitudinal member and a lower longitudinal member, the rear member being further coupled to a rear wheel such that an outer wheel periphery is below the lower longitudinal member.

8. The patient aid of claim 1, further comprising a back rest pivot point.

9. The patient aid of claim 1, further comprising a symmetrically shaped backrest.

10. The patient aid of claim 1, further comprising a cup holder.

11. The patient aid of claim 10, wherein the cup holder is coupled to the frame.

12. The patient aid of claim 10, wherein the cup holder is coupled to the upper longitudinal member.

13. A convertible wheeled patient aid for assisting a patient in a first transport mode and a second transport mode comprising:

a frame having at least one wheel, a seat, a handle;

a configurable back rest, configurable from a first position to a second position;

a first leg rigging movably coupled to the frame from a first unstowed position to a second stowed position;

a first leg rigging retaining member that pivots about a first pivot, selectively engageable with the first leg rigging in the stowed position but not in the unstowed position;

a second leg rigging that is separate from the first leg rigging and that is movably coupled to the frame from a first unstowed position to a second stowed position; and a second leg rigging retaining member that pivots about a second pivot that is physically discrete from the first pivot, selectively engageable with the second leg rigging in the stowed position but not in the unstowed position.

* * * * *